INVENTOR.
ALFRED BIRGER IVAR HOLMGREN
BY
ATTORNEYS

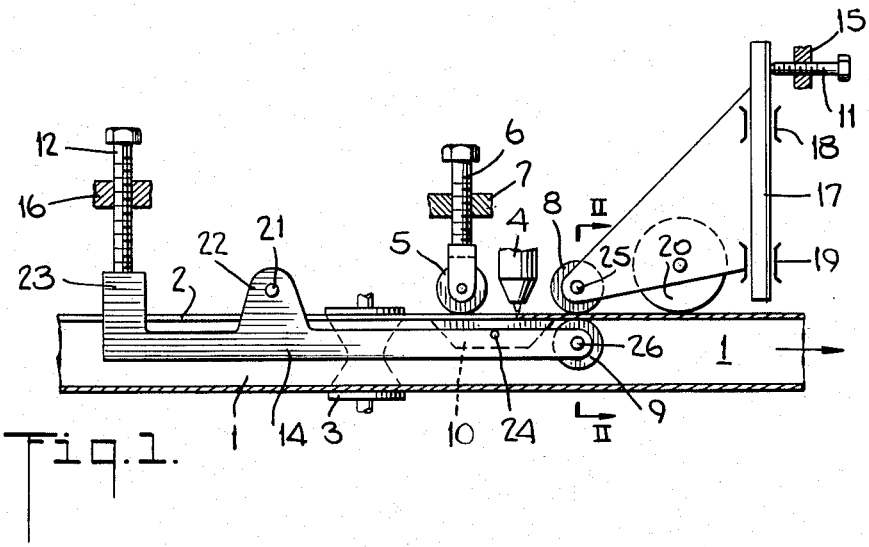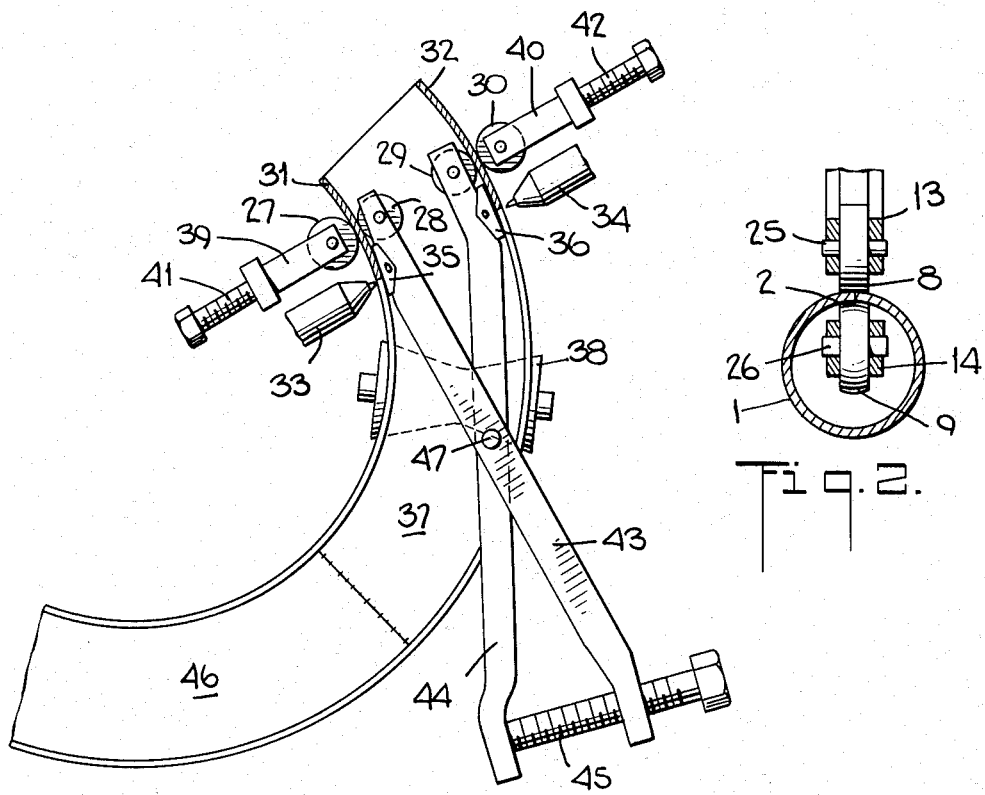

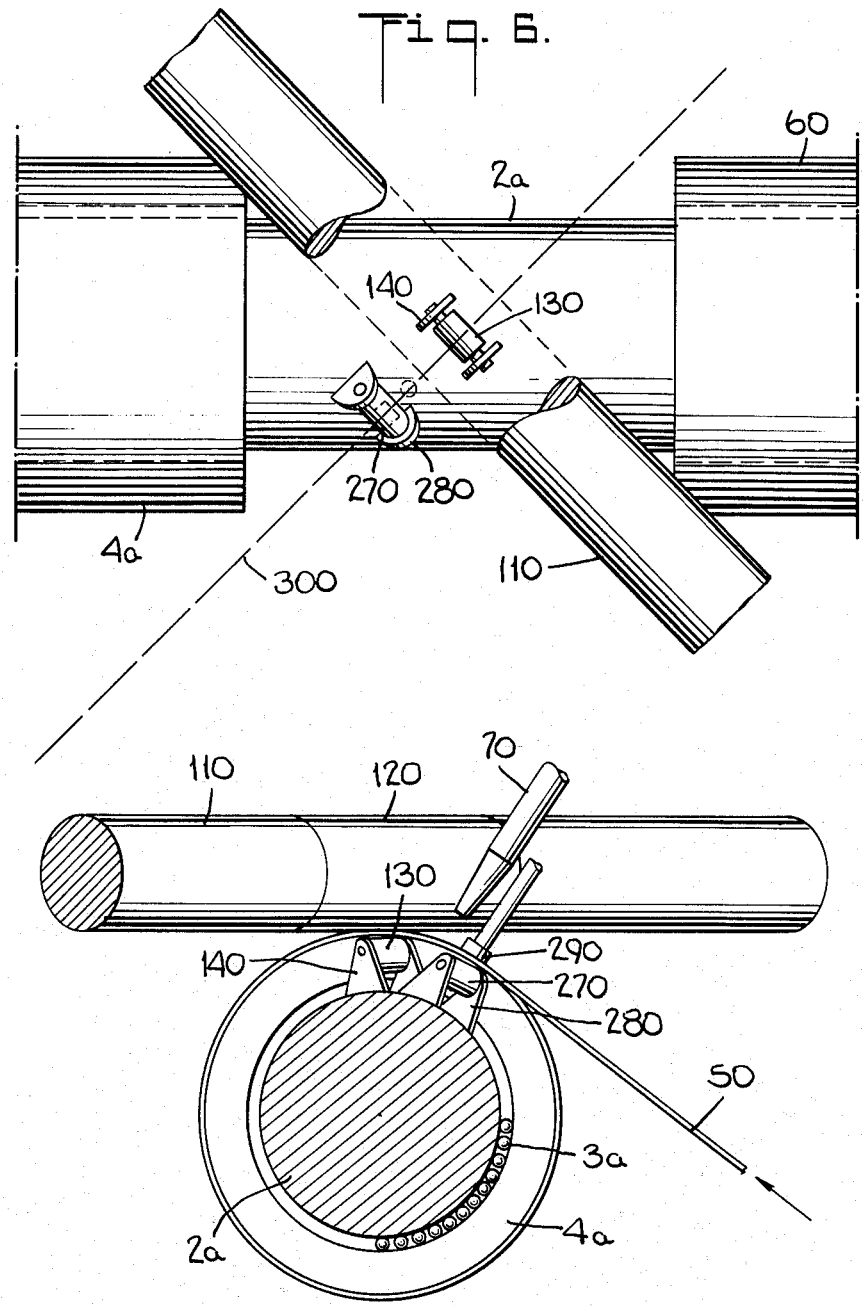

United States Patent Office 3,263,054
Patented July 26, 1966

3,263,054
METHOD FOR PRODUCING WELDED PRODUCTS AND A DEVICE FOR CARRYING OUT THE METHOD
Alfred Birger Ivar Holmgren, Fack 8, Skutskar, Sweden
Filed Oct. 31, 1962, Ser. No. 234,497
Claims priority, application Sweden, Sept. 18, 1962, 10,031/62
3 Claims. (Cl. 219—60)

The present invention relates to a method for producing welded articles, preferably pipes, in which parts or portions are welded together along at least one joint or seam.

The welds, especially electric welds, have hitherto been rather uneven showing upstanding or projecting beads. The unevenness involves poor strength and the projecting beads cause serious obstructions and may even clog pipes used for conduction of suspensions like pulp.

It is an object of the present invention to eliminate the above disadvantages of welded pipes and to provide pipes with very smooth welds which are flush or in line with the surrounding surfaces of the pipes.

Another object of the invention is to give the weld seam a considerably increased strength.

The method according to the invention is characterized in that the weld seam or bead is on both sides submitted to a permanent setting e.g. by means of rollers, wheels, shoes or the like members on the outside as well as on the inside of the tube, whereby a rolling or compressing action is performed.

According to a further feature of the invention the rolling or compressing members are situated opposite each other on both sides of the weld seam or bead.

The rolling and compressing action produces an extremely even and smooth surface at the welded portions, and the strength of the seam or joint is considerably increased due to the increased density of the weld.

The invention will be further declared in the following specification, reference being had to the accompanying drawings, in which:

FIG. 1 is a diagrammatic view of a device for welding a tube seen at right angles to the longitudinal direction of the pipe.

FIG. 2 is a section along the line II—II in FIG. 1.

FIG. 3 is a modified double embodiment for welding bent pipe parts.

FIG. 6 is a plan view similar to FIG. 4 illustrating at a larger scale the mutual arrangement of the driving shaft and rollers within the tube.

FIG. 7 is a section at the same scale as FIG. 6 at right angles to the pipe being wound.

Figure 4:
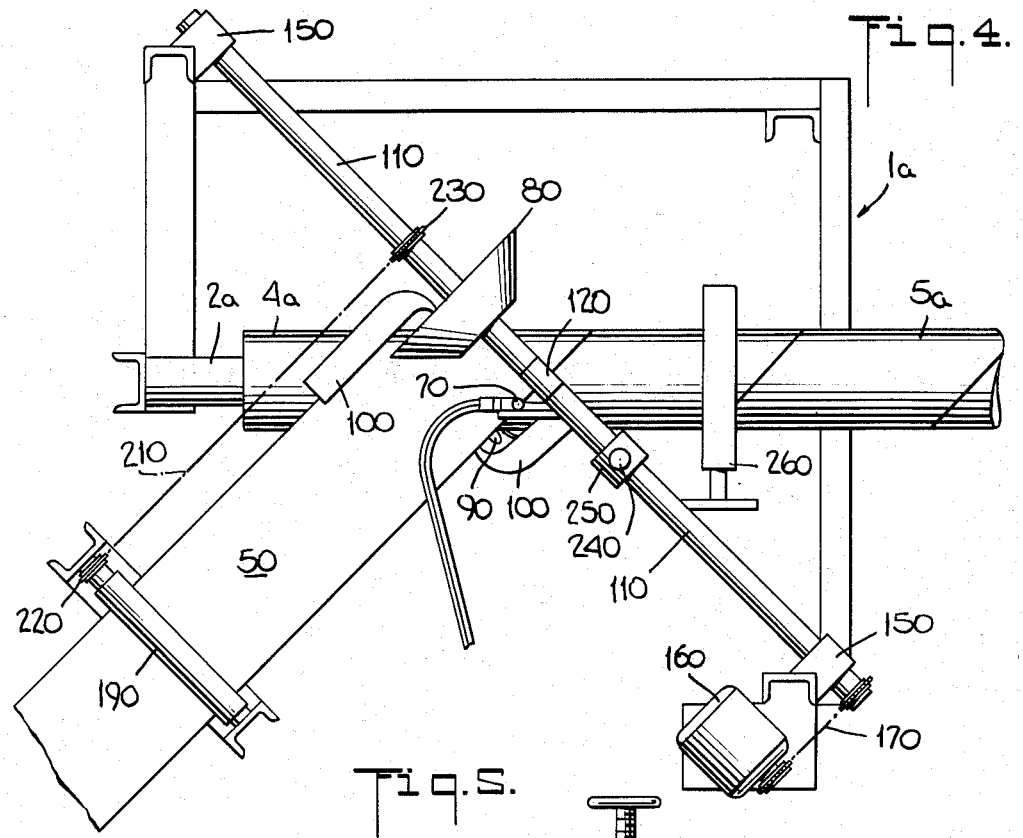
FIG. 4 is a plan view of another embodiment of the invention seen from the line I—I in FIG. 5.
Figure 5:
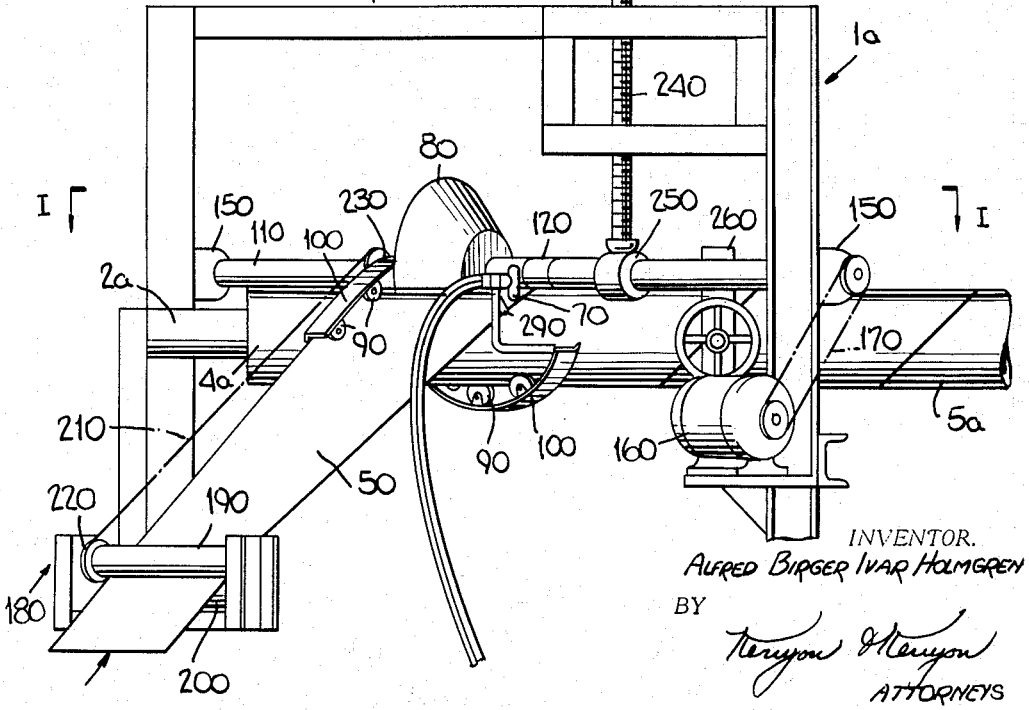
FIG. 5 is a side horizontal view at right angles to a pipe being wound of band material and to a driving shaft.

Reference is first had to FIGS. 1 and 2 where 1 designates a pipe blank made of plate or sheet metal e.g. by rolling and showing a longitudinal joint 2 to be welded. The pipe blank is continuously fed between two holding rollers 3 having a double conical form and holding the plate edges at the joint together ready for welding. 4 is a welding burner with an outlet for protecting gas, e.g. argon, near the joint or seam 2.

5 designates a roller holding the pipe portions flush or in mutual register, the roller being provided with an adjusting screw threaded in a fix part 7 for setting a suitable pressure against the joint 2.

Within the pipe and opposite to the roller 5 and the burner 4 there is a shoe abutting on the inside of joint 2 and thus holding the joint portions in the correct mutual position and preventing air within the pipe from reaching the joint.

8 and 9 designate a pair of rollers adapted to exert pressure on both sides of the actually produced weld (the pipe is being fed in the direction indicated by an arrow) which is still in a fluid or at least in a sticky, tough or tenacious condition. The weld bead is thus submitted to a rolling and compressing action and the finished weld seam will thereby be perfectly even, dense, uniform and smooth in structure as well as in looks. To this result the shoe 10 contributes, and the shoe which may be made of copper makes the use of fluxing material superfluous.

The extraordinary evenness, density, uniformity, smoothness and general high quality of the weld has been proved also by X-ray investigations which have shown that the weld is absolutely uniform, dense, compact and tight throughout and also at the plate edges, and there is no tendency to any formation of drops. The rolling pressure thus most effectively compressing and eliminating all possible cavities, flaws, and holes in the material of the weld, and the strength will be a maximum.

The pressure exerted by the rollers 8 and 9 upon the weld bead is variable through adjustment screws 11, 12 acting on two arms 13, 14 carrying the rollers 8 and 9, respectively. The screws 11, 12 thread in fix parts 15 and 16, respectively.

The arm 13 is fastened to a rod 17 glideable in swingable bearings 18, 19. The arm may be provided with another abutment roller 20.

The arm 14 carrying the roller 9 is swingably about a stationary pin 21 outside the pipe by a projection 22 of arm 14 projecting through the joint 2 at a place still not yet welded. Another projection 23 also projects outwardly through the joint 2 to coact with screw 12.

The arm 14 extends longitudinally within the pipe blank and carries not only the roller 9 but also the shoe 10 which is swingably mounted by a pin 24 and thus able to adjust itself according to the inside of the pipe. The shoe has a form corresponding to this inside.

The feed of the pipe in the direction of the arrow in FIG. 1 should be uniform, and it may be performed in any known way.

The arms 13, 14 may be forked at their portions bearing rollers 8, 9 (FIG. 2). Bearing pins are designated 25, 26.

For the sake of clearness one half of the pipe 1 is cut away in FIG. 1.

The embodiment of FIG. 3 has two simultaneously acting rolling devices. Thus, there are two pairs of rollers 27, 28 and 29, 30 for rolling each one of two weld beads 31 and 32, respectively, and two welding burners 33, 34 (e.g. of the argon type) one for each of the joints 31, 32. Likewise there are two shoes 35, 36 within the pipe which consists of two curved halves. FIG. 3 shows only the remote one 37 of the halves. Holding wheels are designated by 38.

The outer rollers 27, 30 are carried by forked members 39 and 40, respectively, which are adjustable by screws 41 and 42, respectively, while the inner rollers 28, 29 are carried by arms 43 and 44, respectively, which are like scissors linked to each other. The angle between the arms and followingly the pressure of the rollers 28, 29 upon the weld beads 31 and 32, respectively, is adjustable through setting a screw 45 threaded in arm 43 and abutting against arm 44.

Through the device of FIG. 3 it is possible continuously to produce curved welded pipes of plates and metal sheets. The blanks, that is the curved halves of the pipe, are cut out of plate or sheet material and bent into the cross-sectional form of halves of a circle line. These halves are then in pairs fed to the welding burners 33, 34 by means of the wheels 38. Further curved pipe blank halves 46 may be welded to the halves 37 already being welded.

The arms 43, 44 project out of the space inside the halves 37 through the joint 32 at a place not yet welded in order to adjust screw 45. The arms 14, 43, 44 are thin so as not to form any substantial obstruction in the joint 32.

In the embodiment shown in FIGS. 4–7 1a designates the whole of a frame at least partly consisting of U-balks which involve great strength and rigidness. To the frame is fastened a mandrel 2a around which a support roller 4a is mounted by anti-friction bearing elements 3a (FIG. 4). From a supply source not shown the roller 4a receives band material 50 which is being continuously and helically wound around the roller 4a and possibly around one or more supporting rollers 50 mounted on the mandrel 2a (FIG. 3) so that a tube form 5' is obtained with the turns of winding being rather close together so as to be welded together by a welding burner or any other welding apparatus 70. Correct winding of the band on the roller 4a is ensured by a conical holding wheel 80 and a series of small wheels 90 mounted on a helical holder 100.

A pressure causing permanent setting of the just welded bead or seam is performed by an outer roller 120 rigidly mounted on a shaft 110 arranged at an angle to the mandrel 2 and an inner roller 130 mounted on brackets 140 fastened to the mandrel. The roller 120 is in the embodiment shown formed by a hardened portion of the shaft 110. This shaft is mounted in bearings 150 on the frame 1a and driven by a motor 160 through a chain 170.

A most efficient and thorough plastic action is executed on the weld bead through the fact that the roller 120 is driven in relation to the weld. In other words, the roller 120 strives to rotate or roll along the bead more or less faster than what croresponds to the feed velocity of the band and the bead. The roller 120 followingly exerts a stretching action on the weld bead and the band 50 being wound on the support roller 4a.

In order to obtain this stretching effect there is a feed device 180 comprising two feed rollers 190, 200 which determine the feed velocity of the band 50. At least one of the rollers, 190, is driven at a periphery or circumferential speed which is at least slightly less than the periphery speed of the roller 120, and this roller will, therefore, always skid, slip or drag on the weld bead which is hereby strongly and thoroughly actuated, compressed and smoothed to an absolute evenness and uniformity with surrounding surfaces of the pipe. At the same time the material of the weld is made very dense, tight and strong.

This speed difference is obtained through the fact that the roller 190 is through a chain 210 connected to the shaft 110. The chain runs around tooth wheels 220, 230 of the roller 190 and the shaft 110, respectively, and the difference of the speeds is guaranteed by the fact that the wheel 230 has smaller diameter than the wheel 220.

In order always to obtain a positive abutment and good action of the roller 120 (which may be arranged solely to cause the necessary rotation of the pipe 5a) an adjustment screw 240 is threaded in the frame 1a and forms an abutment for the shaft 110, preferably a portion 250 with increased diameter. Another adjustment device 260 may support the pipe 5a and set it in a correct winding position in relation to the rollers 190, 200.

To bring the edges of the band 50 exactly in register opposite to each other close to the welding apparatus 70 another roller 270 may be mounted on a bracket 280 of the mandrel 2a and adapted to coact with a gliding shoe 290 outside the pipe.

In FIG. 6 the band material and the roller 120 are removed in order to illustrate the mutual arrangement of the parts. The figure shows clearly how the support wheels 130, 270 and their brackets 140, 280 are placed between the winding rollers 4a and 60. The weld seam is indicated by the dotted line 300, and the figure shows clearly that the shaft 110 is at right angles to the weld seam or bead.

The support roller 80 (FIGS. 1 and 2) is preferably free to rotate on the shaft 110 and is only supporting, not driving nor braking.

Instead of driving only one roller, designated by 120, it is possible to drive also the roller 130 on the other side of the weld. The roller 130 may be driven with the same periphery speed as the roller 120 or perhaps with a slightly lower speed in respect of the slightly smaller inner diameter of the pipe.

The plastic permanent setting through a rolling or compressing action according to the present invention shall be performed in such a close connection to the welding operation that the heated material is still in a soft or plastic condition permitting an efficient and thorough permanent setting or deformation. As an example it may be mentioned that if the material is stainless steel the weld should not be allowed to cool to a temperature lower than about 900° C. The most suitable temperature in this respect of stainless steel containing 18% Cr and 8% Ni is about 1000° C.

It is to be observed that the invention is not restricted only to the embodiments shown and described here, since many other embodiments are possible within the scope of the invention.

What I claim is:

1. A welding device for producing a pipe weld seam comprising: a welding burner adapted to form a weld bead along the seam of whatever partially formed pipe is fed to said device, a pair of rollers opposed to one another and adjacent to said welding burner, the spacing between said rollers being adjustable to accept whatever weld bead may have been laid down along the seam of the pipe so that one of said rollers is on the outside of said pipe and the other of said rollers is on the inside of said pipe, means for applying pressure between said rollers, said welding burner and said rollers being sufficiently close to one another so that pressure applied by said rollers will work on the weld bead while the bead is hot and malleable, and means for driving one of said rollers at a rotational speed such that it will skid relative to the weld bead.

2. The welding device of claim 1 further characterized by an adjustable shoe opposed to said welding burner and adjustable to permit the pipe seam to pass between said welding burner and said shoe, said shoe being adapted to supporting the pipe at the seam of the pipe.

3. The method of producing a butt weld seam between two metal edge portions comprising the steps of: feeding said metal edge portions in butt relationship to a welding burner, applying a weld bead between said two edge portions, immediately feeding said weld bead between two pressure rollers while driving one of said rollers at a rotational speed such that the peripheral velocity of said one of said rollers differs from the feed rate of said weld bead, whereby said rollers apply pressure and friction to said bead while said bead is hot and malleable so that said bead can be worked down to be flush with said metal edge portions.

References Cited by the Examiner

UNITED STATES PATENTS

| | | | |
|---|---|---|---|
| 1,623,434 | 4/1927 | Ofner et al. | 219—60 |
| 1,806,958 | 5/1931 | Strobel | 219—61 |
| 1,952,319 | 3/1934 | Hull | 219—60 |
| 2,403,221 | 7/1946 | Howard | 113—59 |
| 2,630,514 | 3/1953 | Schaefer | 219—61 |
| 2,819,379 | 6/1958 | Wiley et al. | 219—62 |

FOREIGN PATENTS 576,019   5/1959   Canada.

ANTHONY BARTIS, *Acting Primary Examiner.*

RICHARD W. WOOD, *Examiner.*